United States Patent [19]
Behtash et al.

[11] Patent Number: 5,553,076
[45] Date of Patent: Sep. 3, 1996

[54] METHOD AND APPARATUS FOR A WIRELESS LOCAL AREA NETWORK

[75] Inventors: Saman Behtash, Berkeley; Christopher Flores, Oakland; Adel Ghanem, Danville, all of Calif.

[73] Assignee: TCSI Corporation, Berkeley, Calif.

[21] Appl. No.: 236,588

[22] Filed: May 2, 1994

[51] Int. Cl.$^6$ .................................................. H04J 3/16
[52] U.S. Cl. ...................... 370/95.3; 370/100.1; 375/356
[58] Field of Search ................................. 370/94.1, 95.1,
370/95.3, 16, 50, 58.1, 58.2, 58.3, 68, 69.1,
77, 85.7, 85.13, 94.2, 94.3, 95.2, 100.1,
105.1, 110.1, 108, 48, 57; 381/86, 57, 104,
107; 455/238, 164.1, 192.2, 196.1, 38.1,
23, 33.1, 33.2, 37.1, 51.1, 56.1; 375/12,
106, 14, 95, 94, 0, 81, 93, 10.121, 230,
232, 213, 354, 340, 205, 200, 207, 356,
359, 362, 364, 369; 329/304, 310, 318;
379/58, 59, 60

[56] References Cited

U.S. PATENT DOCUMENTS

| | | | |
|---|---|---|---|
| 4,558,460 | 12/1985 | Tanaka et al. | 455/238.1 |
| 4,947,409 | 8/1990 | Raith et al. | 375/97 |
| 5,001,724 | 3/1991 | Birgenheier et al. | 329/304 |
| 5,012,491 | 4/1991 | Iwasaki | 375/96 |
| 5,018,166 | 5/1991 | Tjahajdi | 375/106 |
| 5,027,432 | 6/1991 | Skala et al. | 455/238.1 |
| 5,040,192 | 8/1991 | Tjahajdi | 375/80 |
| 5,187,719 | 2/1993 | Birgenheier et al. | 375/39 |
| 5,202,901 | 4/1993 | Chennakeshu et al. | 329/304 |
| 5,257,265 | 10/1993 | Su et al. | 375/12 |
| 5,263,026 | 11/1993 | Parr et al. | 275/14 |
| 5,267,244 | 11/1993 | Messerschmitt et al. | 370/95.3 |
| 5,272,446 | 12/1993 | Chalmers et al. | 375/80 |
| 5,276,706 | 1/1994 | Critchlow | 375/96 |
| 5,282,228 | 1/1994 | Scott et al. | 375/97 |
| 5,287,388 | 2/1994 | Ogura et al. | 375/97 |
| 5,309,482 | 5/1994 | Wright et al. | 375/106 |
| 5,377,192 | 12/1994 | Goodings et al. | 370/95.3 |

OTHER PUBLICATIONS

A. Higashi et al., NTT Radio Communication Systems Lab., "BER Performance of Mobile Equalizer Using RLS Algorithm in Selective Fading Environment".
S. Sampei, "Development of Japanese Adaptive Equalizing Technology Toward High Bit Rate Data Transmission in Land Mobile Communications", IEICE Transactions, vol. E 74, No. 6, Jun. 1991.
Y. Liu, "Bi–Directinal Equalization Technique for TDMA Communication Systems over Land Mobile Radio Channels", pp. 1458–1462, Globecom '91.
USSN 08/109,061 F. Aug. 1993.
USSN 08/107,451 F. Aug. 1993.
USSN 08/108,113 F. Aug. 1993.
USSN 08/107,938 F. Aug. 1993.
USSN 08/108,084 F. Aug. 1993.

*Primary Examiner*—Douglas W. Olms
*Assistant Examiner*—Dang Ton
*Attorney, Agent, or Firm*—Limbach & Limbach L.L.P.; Ronald L. Yin

[57] ABSTRACT

A protocol for wireless local area network communication between a base stationary unit and a plurality of wireless terminals is disclosed. The main features of this protocol is based upon channel reservation requests by active wireless terminals. Contention is resolved and authorization is granted with data message signals transmitted by the authorized wireless terminal either immediately for asynchronous service or periodically for a time-based service. The system further provides for the base stationary unit to query the receipt of the data message signal by the wireless terminal authorized to receive the transmission. If no response signal is received, then the base stationary unit would authorize for itself transmission of the data message to relay it, either "over the air" or via wired connection to another base stationary unit in another data cell. The synchronous nature of the method provides for power saving by allowing the receiver and/or transmitter to be powered down during idle and other time slots.

45 Claims, 4 Drawing Sheets

METHOD AND APPARATUS FOR A WIRELESS LOCAL AREA NETWORK

TECHNICAL FIELD

The present invention relates to a method and an apparatus to wirelessly communicate between a stationary base unit and a plurality of wireless terminals. More particularly, the present invention relates to a digital wireless system which can communicate between a stationary base unit and a plurality of wireless terminals in an asynchronous mode as well as a time-slotted synchronous mode, under the control of the base stationary unit.

BACKGROUND OF THE INVENTION

Wireless digital communication between a stationary base unit and one or more mobile wireless terminals is well known in the art. There are in general three types of transmission methods. In Frequency Division Multiple Access (FDMA), the available electromagnetic communication spectrum is divided into a plurality of frequency channels. Communication between the stationary base unit and one of the wireless terminals is affected over one of the frequency channels. Communication between the stationary base unit and a different wireless terminal is affected over a different frequency channel. In Time-Division Multiple Access (TDMA), transmission between a stationary base unit and a first wireless terminal is affected over a first "slice" in time. Transmission between the stationary base unit and a second wireless terminal is affected over a second "slice" of time, different from the first "slice". Finally, in Code Division Multiple Access (CDMA), communication between a stationary base unit and one or more wireless terminals is accomplished through spread spectrum transmission over a frequency range wherein a unique Pseudo Noise (PN) code distinguishes the communication between a stationary base unit and a first wireless terminal and a different PN code distinguishes the communication between the stationary base unit and a second different wireless terminal. See, for example, U.S. Pat. No. 5,267,244.

The introduction and wide spread use of personal computers in the last decade has given rise to the need for interconnection of these personal computers. This has resulted in the need to design and to develop Local Area Networks (LAN) to interconnect the PC-based processing units. The prevalent LAN's are: Ethernet, where the stations are all connected onto a cable; and Token Ring, where all the stations are connected to each other in the form of a ring. Ethernet is based upon the concept of carrier sensing where all stations listen to the cable and only access the medium if it is idle. In Ethernet, however, since all the competing stations can access the medium at the same time, collision is possible. Thus, Ethernet must provide for collision detection and retry. Token-ring is based on each of the stations waiting for an access token which is passed in round-robin fashion. Since access to the transmission medium occurs only upon the receipt of the token, collision is avoided. However, the stations do have to wait for their assigned token.

With the introduction of portable laptop and notebook computers and the merging of the computer with the wireless medium, such as radio frequency (as exemplified in cellular telephone networks), or infrared waves or other signals, there is a growing need for wireless connectivity for these portable computers. Wireless LAN's face a number of hurdles. These include restrictions on the allocation of frequency spectrum, limitations on the feasible data rates over the air, interference propagation, and power consumption.

Furthermore, protocol such as Ethernet or token-ring are inadequate for wireless LANs for several reasons. First, with respect to Ethernet, it assumes that all stations can listen to one another, which may not be possible in the wireless case. Secondly, due to the introduction of multi-media applications, there is an additional requirement to support both asynchronous services (e.g. data) and time based services (e.g. voice).

One prior an solution to the first problem, which is also known as he "hidden terminal" problem is to use a hub-based system, wherein all information exchanged between two wireless terminals is relayed by a hub or central stationary base unit. This is a waste of precious wireless bandwidth when the two wireless terminals are in range of one another. With respect to the second problem, the prior an has suggested partitioning the medium into two bands: one for asynchronous service and the other for time-based services, and providing independent protocol and controls for each of the two bands. This has now been codified in the United states by the FCC in its recent ruling on unlicensed Personal Communication Service (PCS). Asynchronous service requires the entire medium bandwidth for a burst duration and are tolerant to variable access delays, whereas time-based services require a fraction of the bandwidth on a periodic basis and are not tolerant of variable access delays.

SUMMARY OF THE INVENTION

Accordingly, there exists a need to provide a method and an apparatus for providing wireless communication between a plurality of wireless terminals or portable computing units, and a stationary base station, that can support both asynchronous communication and time-based services. As used herein, the wireless terminal can be any type of electronic device capable of transmitting and receiving digital data. This includes, but is not limited to, portable computers, digital cellular phones, digital modems, or any of the combination of the foregoing. The method provides transmitting periodically by the base station at the start of a first period of time (hereinafter "slot"), a synchronization signal and a status signal, transmitted over a period of time (hereinafter "initial period") measured from the commencement of said first slot. The synchronization signal is a clocking signal used by the wireless terminals to synchronize their operation. The status signal represents a command signal controlling the communication to or from the stationary base station. One of the wireless terminals transmits a request signal in a slot, after an initial period measured from the commencement of the slot. Thus, the slot can be the same as or different from the first slot. The request signal indicates the identity of the wireless terminal requesting subsequent transmission, the identity of one or more wireless terminals to whom the subsequent transmission is intended, the number of slots required for the subsequent transmission, and the frequency of the subsequent transmission signal. The base station responds to the receipt of this requested signal by transmitting at the start of a third slot, different from the first and second slots, a synchronization signal, a busy status signal, and an authorization signal, indicating the identity of the wireless terminal authorized to transmit, the identity of one or more wireless terminals authorized to receive, the starting slot and the number of slots for the required subsequent transmission. The base station subsequently transmits at the start of the starting slot, a synchronization signal and a reserve status signal. Whereupon immediately after the transmission of the reserved status signal, the wireless terminal transmits its data signal.

A system to implement the foregoing method is also disclosed. Finally, a base station and a wireless terminal which has power saving features, are also disclosed.

DETAILED DESCRIPTION OF THE DRAWINGS

DETAILED DESCRIPTION OF THE DRAWINGS

Figure 1:
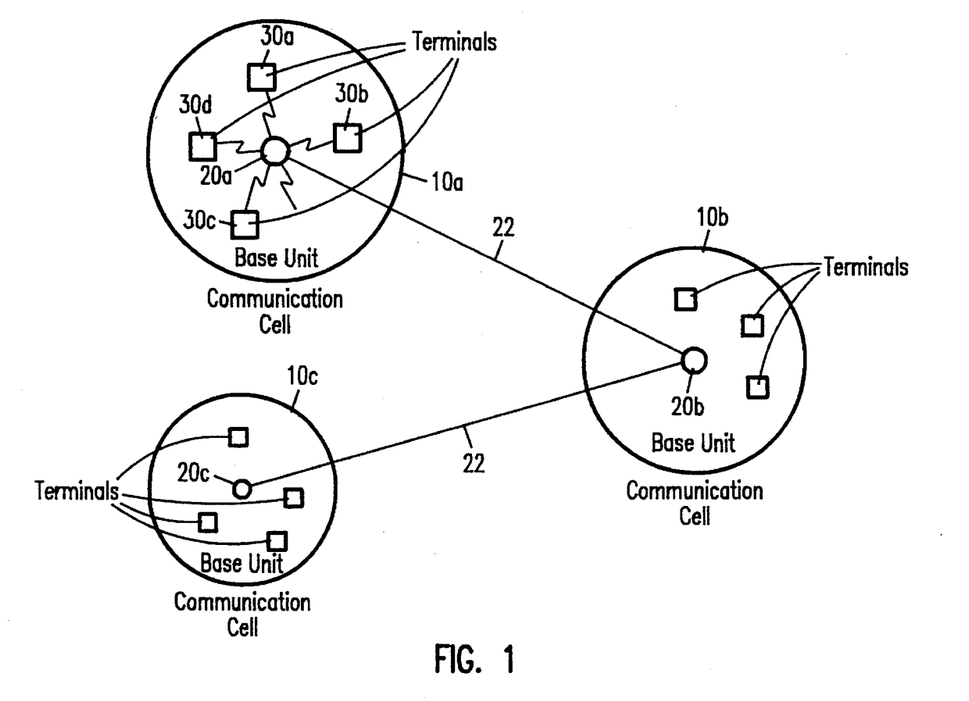
FIG. 1 is a schematic block level diagram of a plurality of communication cells within which are located a stationary base unit and one or more wireless terminals. The plurality of stationary base units are interconnected to one another by a wired network.

Referring to FIG. 1 there is shown a graphical view of a plurality of communication cells 10(a–c). Within each communication cell 10 is an associated stationary base unit 20. The plurality of stationary base units 20(a–c) are all connected to one another by a wired link 22, such as, by for example, a conventional Ethernet network or token ring network.

Within each communication cell 10, the associated stationary base unit 20 communicates wirelessly with a plurality of wireless terminals 30. As previously discussed, the wireless terminal can be any type of electronic device capable of transmitting and receiving digital data. This includes, but is not limited to, portable computers, digital cellular phones, digital modems, or any of the combination of the foregoing. In the preferred embodiment, digitally encoded RF signals are transmitted and received by the stationary base station 20 to one or more of the wireless terminals 30.

Figure 2:
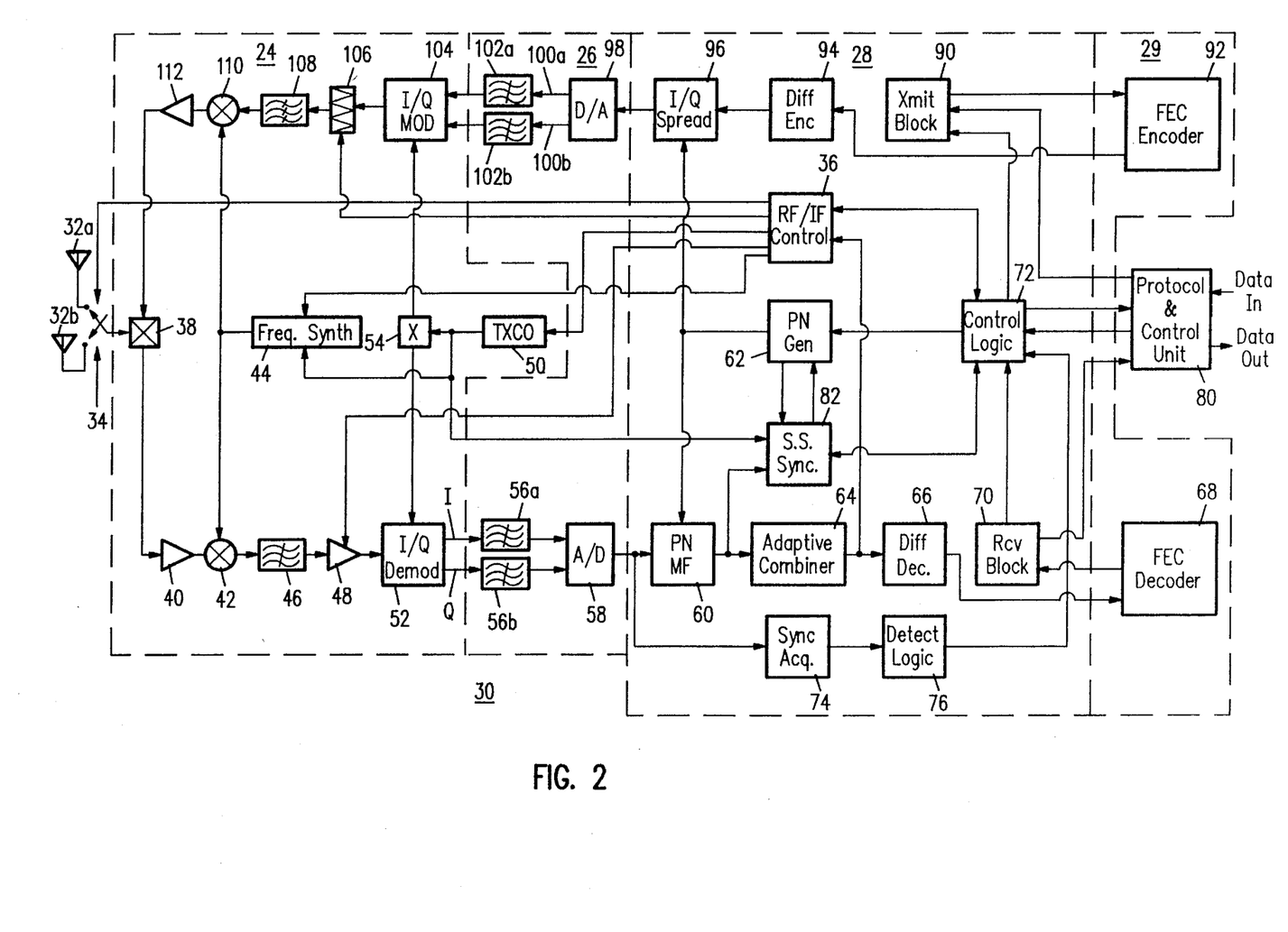
FIG. 2 is a block level diagram of a wireless terminal used in the method and apparatus of the present invention.

Referring to FIG. 2, there is shown a schematic block level diagram of a wireless terminal 30. In general, the wireless terminal 30 comprises an RF/IF unit 24, an Analog Front End (AFE) 26, a Baseband Modem 28, an FEC Codec 29, and a Protocol & Control Unit (PCU) 80, whose components will be described in greater detail hereinafter.

The RF/IF unit 24 performs the functions of carrier-to-baseband signal conversion, the I/Q modulation and demodulation, out-of-band interference rejection, waveform shaping, receive and transmit signal amplification, frequency synthesis, and antenna switching.

The AFE 26 provides the digital-to-analog and analog-to-digital conversion between the RF/IF Unit 24 and the Baseband Modem 28. In addition, AFE unit 26 performs associated anti-aliasing and reconstruction filtering. The digital-to-analog and analog-to-digital conversions are provided for both in-phase and quadrature-phase signals, each of which must be sampled at twice the PN code chip rate.

The Baseband Modem 28 provides the functions of spreading and de-spreading, PN code generation, acquisition and synchronization, combining and message buffering. The Baseband Modem 28 handles many signal processing functions including the control of the RF/IF unit 24 and control logic for the modem blocks.

The FEC Codec 29 implements the Forward Error Correction (FEC) encoder and decoder, which is used to improve the channel Bit Error Rate (BER).

The PCU 80 implements the protocol of the communication which is the method of the present invention, controls the Baseband Modem 28, implements the power saving feature of the present invention, handles messages, and interfaces to the Network Interface Controller (NIC) for the higher protocol layers.

Specifically and in greater detail, the wireless terminal 30 comprises a plurality of antennas 32(a–b), with one antenna 32a or the other antenna 32b, used for transmitting and receiving, depending on which antenna 32a or 32b has the stronger received signal strength. The antennas are connected to a switch 34 which is controlled by an RF/IF control unit 36.

The RF signal received by either antenna 32a or 32b, after passing through the switch 34, is supplied to a transmit/receive (T/R) switch 38. From the T/R switch 38, the received signal is supplied to a low noise amplifier 40, (which may also include a filter). The signal is amplified (and filtered). From the amplifier 40, the amplified received signal is then supplied to a mixer 42 which converts the received amplified RF signal into an Intermediate Frequency (IF) signal. The conversion is based upon a difference frequency signal generated by a frequency synthesizer 44. The frequency selected by the frequency synthesizer 44 is based upon a signal supplied from a temperature compensated crystal oscillator 50 and is controlled by the RF/IF control unit 36.

The output of the mixer 42 is then supplied to a second filter 46. The filtered IF signal is then amplified again by a second amplifier 48 whose gain is controlled by the RF/IF control unit 36. From the second amplifier 48, the amplified filtered IF signal is then supplied to an I/Q demodulator 52 whose operating frequency is derived from the temperature compensated crystal oscillator 50, by passing through a multiplier 54. The outputs of the I/Q demodulator 52 are the analog I and analog Q signals.

The analog I and analog Q signals is each supplied to a filter 56(a–b), respectively. From the filters 56, the analog I and analog Q signals are converted into a single interleaved digital signal by an A-to-D converter 58, which produces the digital I/Q signal.

The digital I/Q signal is then supplied to a Pseudo Noise Match Filter (PNMF) 60 which is controlled by the PN generator 62. PNMF 60 serves to de-spread the digital I/Q signal, with the PN generator 62 supplying the necessary PN (Pseudo Noise) code. The output of the PNMF 60 is supplied to an adaptive combiner 64 which serves to improve the signal to noise (S/N) ratio by combining multiple PNMF outputs. From the adaptive combiner 64, the signal is supplied to a differential decoder 66 which determines the received channel bit sequence. Finally, from the differential decoder 66, the signal is supplied to an FEC decoder 68. The FEC decoder 68 serves to correct for bit errors and produces the information bit sequence.

From the FEC decoder 68, the signal is then supplied to a received block 70. The received block 70 performs the function of interpreting the status signal. From the received block 70, the status signal is supplied to a control logic unit (CLU) 72 and other signals to the protocol and control unit 80.

As will be discussed hereinafter, the receiver portion of the wireless terminal 30 also comprises a sync acquisition block 74 which locks onto the sync signal generated by the base station unit 20. The signal from the A to D converter 58 is also supplied to the sync acquisition block 74. The output of the sync acquisition block 74 is a signal which is supplied to a detect logic unit 76 which determines if a sync signal has been detected. From the detect logic 76, the signal is supplied to the CLU 72.

The PNMF 60 is also in communication with the Steady State (SS) sync unit 82 which serves to provide timing compensation and antenna selection. The SS sync 82 also receives the output of the temperature compensated crystal oscillator 50. In addition, the SS sync 82 is in communication with the CLU 72 as well as the PN generator 62.

In the transmit mode, data is received by the protocol and control unit 80 from the NIC, or from the rest of the digital system. The data is then supplied to a transmit block 90 which buffers the signal prior to transmission. The transmit block 90 is under the control of the CLU 72, which determines the transmission time based upon the received status signal. The output of the transmit block 90 is supplied to the FEC encoder 92 which adds bits to the information bits for error correction. From the output of the FEC encoder 92, the signal is then supplied to a differential encoder 94. The differential encoder 94 determines the transmitted symbol sequence. The output of the differential encoder 94 is then supplied to an I/Q spread unit 96 which is under the control of the PN generator 62. The I/Q spread unit 96 spreads the signal. The signal from the I/Q spread unit 96 is then supplied to a D-to-A converter 98 which produces the analog I and analog Q signals 100a and 100b respectively. The analog signals I and Q are each supplied to a filter 102. From the filters 102(a-b), the analog I and Q signals are supplied to an I/Q modulator 104 which modulates the I/Q signals. The I/Q modulator 104 modulates the I/Q signals based upon a carrier signal, whose frequency is supplied from the temperature compensator crystal oscillator 50 multiplied by the multiplier 54. The modulated I/Q signal is then supplied to a variable attenuator 106, which performs the function of power control. The variable attenuator 106 is under the control of RF/IF control unit 36. From the output of the variable attenuator 106, the signal is supplied to a filter 108. From the filter 108, the signal is converted into an RF signal by the multiplier 110 which is under the control of the frequency synthesizer 44. The RF signal is then amplified by an amplifier 112 and is then sent through the T/R switch 38 for transmission by the antenna 32a or 32b.

Thus, from FIG. 2, it can be seen that the RF/IF unit 24 comprises amplifier 112, multiplier 110, filter 108, variable attenuator 106, I/Q modulator 104, low noise amplifier 40, mixer 42, second filter 46, second amplifier 48, I/Q demodulator 52, multiplier 54, temperature compensated crystal oscillator 50, frequency synthesizer 44, and the transmit/receive (T/R) switch 38. The Analog From End (AFE) 26 comprises filters 102(a-b), D-to-A converter 98, filters 56(a-b), and A-to-D converter 58. The Baseband Modem 28 comprises I/Q spread unit 96, differential encoder 94, transmit block 90, RF/IF control unit 36, PN generator 62, Steady State (SS) sync unit 82, Pseudo Noise Match Filter (PNMF) 60, adaptive combiner 64, sync acquisition block 74, differential decoder 66, detect logic unit 76, received block 70, and control logic unit 72. The FEC Codec 29 comprises the FEC decoder 68, and the FEC encoder 92. Finally, the wireless terminal 30 comprises the Unit (PCU) 80.

Figure 3:
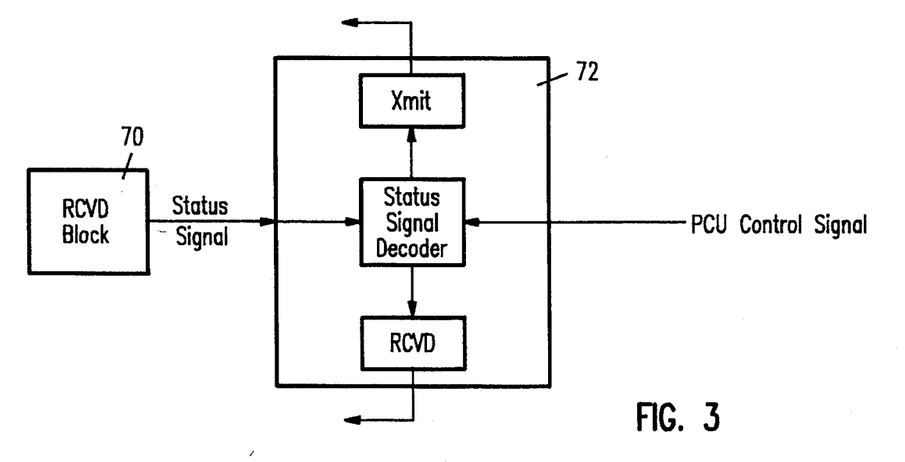
FIG. 3 is a block level diagram of portion of the wireless terminal shown in FIG. 2, showing the power saving circuit of the present invention.

Referring to FIG. 3 there is shown a detailed block diagram of a portion of the wireless terminal 30 shown in FIG. 2. In FIG. 3, the schematic diagram shows the CLU 72 controlling the power to the wireless terminal unit 30. Since the wireless terminal 30 is a portable terminal, the power source is necessarily a cordless source, such as batteries. The status signal generated by the received block 70 is supplied to the CLU 72, along with the control signal from the PCU 80. In response the CLU 72 decodes the status signal and controls the power of the transmitter portion and the receiver portion in accordance with the following table:

| Status Signal | PCU Control Signal | Receiver Control | Xmit Control |
| --- | --- | --- | --- |
| IDLE | REQUEST | OFF | ON |
| BUSY | — | ON | OFF |
| RES | TRANSMIT | OFF | ON |
| RES | RECEIVE | ON | OFF |

The meaning of these signals will be explained in greater detail hereinafter.

Figure 4:
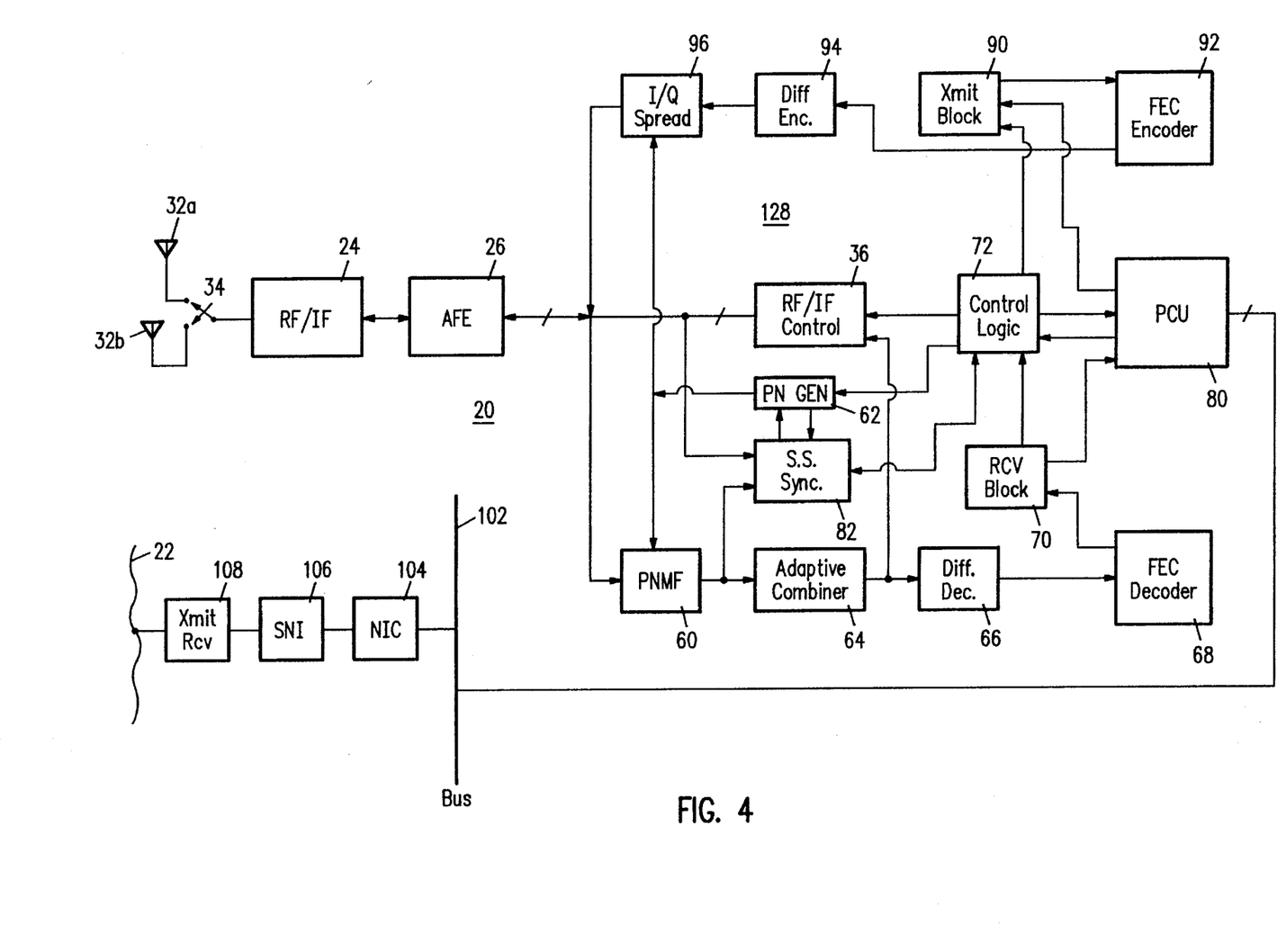
FIG. 4 is a block level diagram of a stationary base unit used in the method and apparatus of the present invention.

Referring to FIG. 4, there is shown one embodiment of a base stationary unit 20. The base stationary unit 20 is very similar to the wireless terminal 30. In block diagram form, the base stationary unit 20 comprises the two antennas 32a and 32b connected to a switch 34 which is controlled by an RF/IF control unit 36. The two antennas 32a and 32b perform the same functions as the two antennas for the wireless terminal 30. The signals to and from the antennas 32(a-b) are supplied by the RF/IF unit 24, which is the same as that described for the wireless terminal 30. The RF/IF unit 24 is connected to the AFE unit 26, which is also the same as that described for the wireless terminal 30. A baseband modem 128 is also connected to the AFE unit 26. The baseband modem 128 is similar to the baseband modem 28, except for the absence of the sync acquisition block 74 and the detect logic 76. In all other aspects, the baseband modem 128 is similar to the baseband modem 28. The FEC Codec 29 is similar to the FEC Codec shown and described for the wireless terminal 30. Finally, the PCU 80 is also similar to the PCU 80 shown and described for the PCU 80 of the wireless terminal 30.

In the base stationary unit 20, the PCU 20 is connected to a host bus 102. A Network Interface Controller (NIC) 104 is also connected to the bus 102. The NIC 104 is connected to a Serial Network Interface (SNI) 106, which is also connected to a transceiver 108. Finally, the transceiver 108 is connected to the wired link 22, which is connected to other base stationary units 20, in other cells.

In addition to the functions described heretofore for the PCU 80 operating in the wireless terminal 30, the PCU 80 in the base stationary unit 20 performs the additional functions of maintaining a list of registered wireless terminals 30, a list of messages received over-the-air, if the message is broadcast or if the destination terminal is not in the registered list, then the message is sent over the host bus 102 to the NIC 104. For messages that are received from the NIC 104, if the message is a broadcast or the destination wireless terminal 30 is in the registered list, then the message is transmitted over-the-air by the base stationary unit 20. The NIC 104 buffers the messages to and from the wired network and implements the various wired protocol, such as Ethernet or Token Ring. The SNI 108 provides the media dependent physical layer functions such as signal encoding, timing generation, and loop-back testing for the various wired network protocols, such as Ethernet or Token Ring. Finally, the transceiver 108 provides the transmitter and receiver drivers specific to the type of physical media for the wired link 22.

Figure 5:
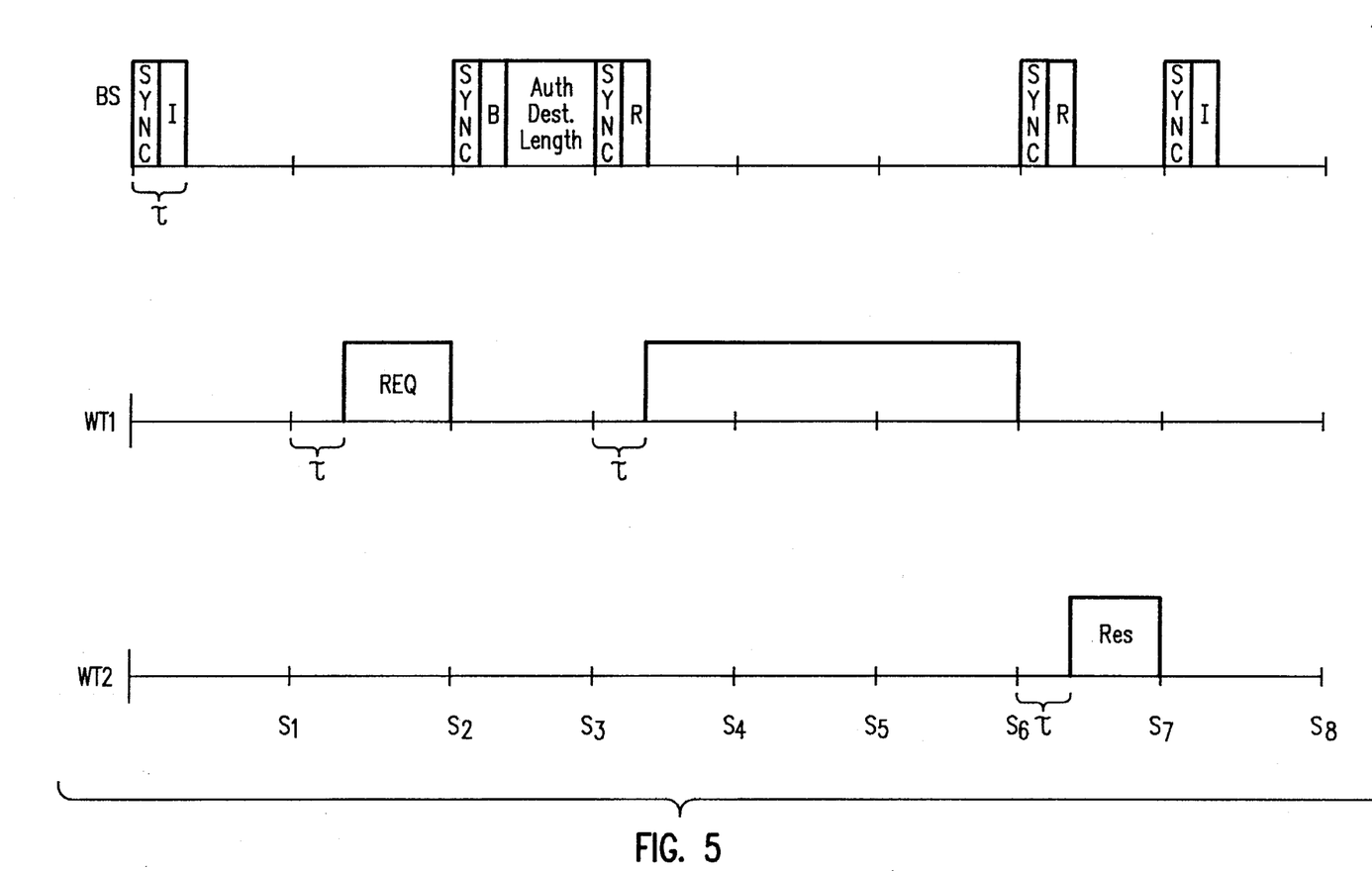
FIG. 5 is a timing diagram showing the protocol of communication between the stationary base unit and one or more wireless terminals within its cell.

The operation of the base stationary unit 20 and its associated one or more wireless terminals 30 operating within its data cell 10 will now be explained with reference to FIG. 5. Initially, however, all the wireless terminals 30 must complete a registration process to identify themselves to the base stationary unit 20a. The registration procedure occurs over the air and requires each wireless terminal 30 to know the unique SYNC PN sequence used by the base stationary unit 20a. This unique SYNC PN sequence will be used in the description set forth hereinafter. The unique SYNC PN sequence can be entered manually beforehand in each wireless terminal 30. As will be discussed hereinafter, the SYNC PN sequence is used to maintain timing of communication between each wireless terminal 30, which is registered, and the base unit 20, and to decode the status signal. Therefore, all registered wireless terminals 30 can communicate with the base unit 20. All other wireless terminals 30, although may be present in the same communication cell 10, will not be able to communicate with the base unit 20. FIG. 5 shows a time scale divided into eight (8) periods of time (hereinafter each period is termed a "slot"). A collection of contiguous slots will be termed "megaslot". As shown in FIG. 5, an example of a megaslot is a collection of seven (7) slots. However, the number of slots that comprise a megaslot can vary from time to time. However, the maximum size of a megaslot is determined by the frequency drift of each of the wireless terminals 30. As will be seen, one of the unique features of the method of the present invention, to conserve power and bandwidth, is for the stationary base unit 20 to transmit a synchronization signal only at the commencement of every megaslot. Since frequency drift is the limiting factor for the wireless units 30 to be able to lock onto the synchronization signal from the stationary base unit 20, that becomes the limiting factor as to the maximum size of the megaslot. In the preferred embodiment, each slot is on the order of 200 microseconds in length. The maximum megaslot would be 10 millisec in duration, corresponding to a collection of 50 slots.

Assuming for the moment that initially, only the base stationary unit 20 is active. At the commencement of the first slot of the megaslot, the base unit transmits a synchronization (SYNC) signal followed by a status signal. The status signal can be one of three possibilities: I for Idle indicating that no data signal is to follow; R for Reserved indicating that what follows immediately would be transmission by one or more of the wireless terminals 30; and B for Busy indicating that what follows is data transmission from the base unit 20 to one or more of the wireless terminals 30. Each of these status signals will be described in greater detail hereinafter.

Assuming that initially, the system is idle then the initial status signal that follows the synchronization signal in the first slot transmitted by the base unit 20 is an Idle signal. The total amount of time from the commencement of the transmission of the SYNC signal to the completion of the transmission of the Idle status signal is labeled τ, and is on the order of 50 microsecond.

The SYNC signal transmitted by the base unit 20 is received by each of the wireless terminals 30 within the data cell 10 to the extent that the wireless terminal 30 can so receive (the limitation being interference, etc.). If the wireless terminal 30 received the SYNC signal, then it is used as a clocking signal for the wireless terminal 30. This occurs through the action of the sync acquisition unit 74 through the logic detect unit 76 to the CLU 72. Furthermore, once the status signal is received and is decoded to be Idle by the CLU 72 of each wireless terminal 30, if the wireless terminal 30 does not request transmission (to be discussed hereinafter), then through the circuit shown in FIG. 3, the CLU 72 would power down the transmitter section and the receiver section of the wireless terminal 30, thereby saving power.

Assuming that the base stationary unit 20 does not have anything to transmit. In the method of the present invention, rather than repeating the SYNC signal followed by an Idle status signal, the base stationary unit 20, if it does not have any data messages to transmit, would defer the transmission of SYNC signal accompanied by a status signal until the commencement of a subsequent megaslot, i.e. slot number 8. Since each of the wireless terminals 30 has received the SYNC signal synchronizing its clock signals to that of the stationary base unit 20, the wireless terminals will know the beginning of each slot number without having the need to actually receive a SYNC signal from the stationary base unit 20. Furthermore, each of the wireless terminals would wait a period of τ from the commencement of the slot, to allow the base unit 20 to transmit if the base unit 20 desired to do so. Thereafter, i.e. after the period of τ from the commencement of the slot, if one of the wireless terminals 30 desires to transmit, it would transmit a request control signal to the base unit 20. Thus, the transmission of the request signal can occur in slot number 1 or in a subsequent slot, such as slot number 2. This request control signal contains the identity of the wireless terminal 30 that desires to transmit subsequently, the identity of the wireless terminal 30 that should receive the subsequent transmission, the data signal length (i.e. number of slots of transmission requested), and for time-based service, the request control signal would also contain the frequency of the signal. The frequency of the data message times the data message length corresponds to the bandwidth requirement of the time-based service.

If we assume the request signal was transmitted in slot number 2, and if no other wireless terminal 30 had attempted to transmit a request control signal in slot number 2, then there would be no collision and the base unit 20 would receive the request control signal. The base unit 20 would respond by transmitting in a subsequent slot, i.e. slot number 3, a SYNC signal followed by a Busy status signal. The Busy status signal is then followed by a repetition by the data sent by the requesting wireless terminal 30, i.e. the wireless terminal 30 that is authorized to transmit, the wireless terminal 30 that is authorized to receive, and the length of the transmission, and the offset number of slots to the start of transmission.

However, if there is a collision of the request control signal in slot number 2, i.e., a plurality of wireless terminals 30 transmit their request control signal within time slot number 2, then of course, the base stationary unit 20 would not be able to receive the unique request control signal and would not be able to honor that request by responding in slot number 3 (as explained hereinabove). Thus, there would be no authorization by the base stationary unit 20 and the reservation request signal must be retransmitted by the wireless terminals 30 requesting authorization for subsequent transmission. The retransmission algorithm is a truncated binary exponential backoff algorithm. The number of slots before the nth retransmission attempt is selected is a uniformly distributed random number in the range $0 \leq d < 2^k$ where k is equal to min(n, 10). After 15 retransmission attempts, the reservation request process is deemed to have failed. This truncated binary exponential algorithm is similar to that which is used in Ethernet and provides for stable operation in the wireless environment.

At the start of slot number 3, when the SYNC signal is received by all the wireless terminals 30 in the data cell 10 that can receive the SYNC signal, the CLU 72 would cause the receiver portion of the wireless terminal 30 to be powered on. Once the status signal has been decoded to mean "Busy", the CLU 72 continues to maintain power to the receiver portion of the wireless terminals 30, for the remainder of the time in the slot. This is so that each of the wireless terminals 30 can determine if it is the authorized wireless terminal 30 to transmit or is the authorized wireless terminal 30 to receive.

In a subsequent time slot indicated by the offset number, i.e. slot number 4, the base unit 20 again transmits a SYNC signal at the beginning of the slot, followed by a status signal of R for Reserved. Again, since only the registered terminals 30 can decode the status signal R, and maintain communication timing with the base unit 20, non-registered terminals 30 will not be able to decode the SYNC or status signals. This then affords a limited amount of privacy.

Once the transmission of the Reserved signal from the stationary base unit 20 terminates, the wireless terminal 30 authorized to transmit immediately begins the transmission of its data signals. This is shown by the time delay of $\tau$ in the time scale shown in FIG. 5 for the wireless terminal 30 authorized to transmit. The transmission can span over a plurality of slots. Each of the wireless terminals 30 turns on its receiver portion at the commencement of slot number 4 to receive the SYNC and the status signals. Since the status signal is an R, the CLU 72 maintains power to the transmitter portion only if the wireless terminal 30 is authorized to transmit and the CLU 72 maintains power to the receiver portion only if the wireless terminal 30 is authorized to receive.

Upon termination of transmission by the wireless terminal 30 at the end of slot number 6 (shown in FIG. 5), the base stationary unit 20 transmits yet another SYNC signal at the commencement of slot number 7. This is followed by a yet another status signal of R or reserved. The transmission of the SYNC signal and the associated Reserved status signal by the base unit 20 in slot number 7 serves to signal the wireless terminal 30 authorized to receive to transmit a response signal. If the authorized wireless terminal 30 received the transmitted signal, then it would transmit a response signal. This would be received by the base stationary unit 20 and would end the transmission of one wireless terminal 30 to another.

On the other hand, if no response signal is received by the base stationary unit 20, then the base stationary unit 20 in a subsequent time slot would relay the data message signal transmitted by the authorized wireless terminal 30 in time slots 4, 5 and 6. The base stationary unit 20 can relay this data message signal in one of two ways. If it is determined that the wireless terminal 30 authorized to receive is still in the data cell 10, but is out of the range of the wireless terminal 30 which is authorized to transmit, then the base stationary unit 20 in the data cell 10 would transmit "over the air" within the data cell 10 to the wireless terminal 30 which is authorized to receive. On the other hand, if it is known that the wireless terminal 30 authorized to receive has moved into a different data cell, e.g. data cell 10b, and has registered with the base stationary unit 20b in that data cell 10b, then the base stationary unit 20a would transmit over the wired connection 22 to the second base stationary unit 20b for retransmission, "over the air" within the second data cell 10b.

For time-based services, e.g. voice, the operation is exactly the same to account for out-of-range destinations. However, this is done only for the first data message signal in the time-based service data stream. If the wireless terminal 30 authorized to receive is in the range, and responds with a response signal, then the response signal is not transmitted for subsequent data message signals to save bandwidth. If the wireless terminal 30 authorized to receive moves out-of-range, as indicated by, for example, a drop in the signal-to-noise ratio received by the wireless terminal 30, then the wireless terminal 30 authorized to receive transmits a relay request signal to the base stationary unit 20 during an idle time slot. The relay request signal informs the base unit 20 that the wireless terminal 30 authorized to receive cannot receive the data signal directly from the transmitting wireless terminal 30 and requests the base unit 20 to relay or retransmit the data signal. The base stationary unit 20 responds with a relay confirmation message signal to the wireless terminal 30 which is authorized to receive. The relay confirmation signal indicates the offset in terms of number of time slots for the relayed transmission. The wireless terminal 30 authorized to receive continues to monitor the time slots assigned to it for direct transmission. However, if the wireless terminal 30 authorized to receive moves in the range as indicated by an increase in the signal-to-noise ratio received by it, for direct transmission, the wireless terminal 30 authorized to receive would transmit a direct request message to the base stationary unit 20 during an idle time slot. The base stationary unit 20 would then respond with a direct confirmation message signal to the wireless terminal 30 authorized to receive to cease the relaying of the data message signals.

From the foregoing, it can be seen that there are a number of advantages of the system of transmission of the present invention.

First, in the wireless method and system of the present invention, both asynchronous and time-based services or synchronous transmissions can be accomplished. The system is based on channel reservation requests by active wireless terminals with contention resolution and authorization by the base stationary unit. The data message signals transmitted by the authorized wireless terminal can be either immediately for asynchronous service or periodically for time-based service. In the event of collision in the request by a plurality of wireless terminals for reservation of channel, reservation request collisions are detected in one time slot. For an idle channel, access latency is at most two time slots for the request signal by the wireless terminal to the base stationary unit and the authorization signal from the base unit back to the requesting wireless terminal. This provides low access delay under idle conditions. In addition, there is no segmentation of data messages thereby saving channel and processing overhead. Segmentation is the division of the message signal into slot-size segments, each separated by $\tau$ time period. In the method and apparatus of the present invention the message signal is transmitted continuously without any segmentation.

If the wireless terminal authorized to receive is in the same data cell, and it correctly receives the data message signals, the wireless terminal authorized to receive sends a response message to the base stationary unit confirming receipt of the data message signal. Otherwise, the base stationary unit relays the data message signal. Therefore, the base stationary relays data message signals only for out-of-range wireless terminals. For time-based services, the control overhead for relaying messages is only incurred at the transitions when the wireless terminal authorized to receive moves in and out of range. Except for the control overhead, recovery from transmission bit errors is done by the Logical link Control (LLC) or upper layers, if necessary. A wireless terminal 30 may receive a message that has a random bit error that the FEC decoder 68 cannot correct. The higher layer protocols will recover the message by retransmitting. The PCU 80 is not involved in the retransmission.

The base stationary unit 20 can authorize itself for message transmission when it receives a data message from a second base stationary unit 20 over a wired connection 22 or if it must relay a data message signal to an out-of-range wireless terminal 30 authorized to receive or it must relay a broadcast message to all the wireless terminals 30 in the data cell 10. When a wireless terminal 30 authorized to transmit desires to transmit a broadcast message, none of the wireless terminals in that data cell 10 is authorized to receive during the transmission by the wireless terminal 30 authorized to transmit. The wireless terminals 30 in that data cell 10 receive the broadcast message only as broadcasted by the base stationary unit 20 to prevent receipt of duplicate messages. Lastly, with the CLU 72 controlling the power to the wireless terminal 30 dependent upon the status signal, considerable power savings can be achieved.

It should be noted that the reference in the claims set forth hereinafter to a "first slot", or a "second slot", etc. do not refer to the timing of the slot number. Rather the reference to "first", or "second" etc., is merely to distinguish one slot from another. In addition, while the method and the apparatus has been described with respect to a Pseudo Code Noise system or CDMA, clearly it can be used in FDMA, or any other form of wireless technology or medium.

What is claimed:

1. A method for wireless communication between a plurality of wireless terminals and a base station, said method comprising:

transmitting periodically by said base station, at the start of a first period of time, a synchronization signal and a status signal, transmitted over an initial period of time measured from the commencement of said first period of time, wherein said synchronization signal is a clocking signal and wherein said status signal represents command signal controlling communication to or from said base station;

transmitting a request signal by one of said plurality of wireless terminals, in a second period of time after a predetermined period measured from the commencement of said second period of time, said request signal indicating the identity of the one of said plurality of wireless terminals requesting subsequent transmission, the identity of one or more wireless terminals to whom the subsequent transmission is intended, the number of periods of time required for the subsequent transmission, and the frequency of the subsequent transmission;

receiving by said base station said request signal and responding thereto by transmitting at the start of a third period of time, different from said first period of time, a synchronization signal, a busy status signal, and an authorization signal, indicating the identity of the one wireless terminal authorized to transmit, the identity of one or more wireless terminals authorized to receive, a starting period of time, and the number of periods of time;

transmitting by said base station at the start of said starting period of time, a synchronization signal and a first reserve status signal; and transmitting a data signal by the one wireless terminal immediately after the transmission of said first reserve status signal by said base station.

2. The method of claim 1 wherein said request signal is transmitted in said first period of time.

3. The method of claim 1 wherein said request signal is transmitted in a second period of time different from said first period of time.

4. The method of claim 1 further comprising the steps of:

receiving said synchronization signal by said plurality of wireless terminals to synchronize their clocks after said first period of time.

5. The method of claim 1 further comprising the step of:

receiving said data signal by said base station, transmitted by said wireless terminal authorized; and storing said data signal received.

6. The method of claim 5 further comprising the step of:

transmitting by said base station at the start of a period of time, after transmission of said data signal by the one wireless terminal, a synchronization signal and a second reserve status signal, said second reserve status signal indicating said base station waiting for a response signal from the wireless terminal authorized to receive the data signal.

7. The method of claim 6 further comprising the step of:

retransmitting said data signal by said base station in the event no response signal is received by said base station.

8. The method of claim 5 further comprising the step of retransmitting by said base station as a broadcast signal to said plurality of wireless terminals authorized to receive said data signal.

9. The method of claim 7 wherein said data signal is retransmitted by said base station as a wired relay signal to a second base station for wireless retransmission by said second base station.

10. The method of claim 9 wherein said data signal is retransmitted by said base station as a wired relay signal and is retransmitted by said second base station to a plurality of wireless terminals authorized to receive said data signal.

11. The method of claim 9 wherein said data signal is retransmitted by said base station as a wired relay station and is retransmitted by said second base station to a wireless terminal authorized to received said data signal.

12. The method of claim 1 wherein said base station transmits a synchronization signal after a plurality of periods of time in the event said base station and said plurality of wireless terminals are idle.

13. A method of operating a wireless terminal for communicating wirelessly with a base unit, said method comprising:

supplying power to said wireless terminal periodically at the commencement of a period of time;

receiving a synchronization signal and a status signal transmitted from said base unit by said wireless terminal after the start of said period of time;

decoding said status signal into one of three possible representations;

maintaining power to the receiver of said wireless terminal for the remainder of said period of time, in the event said status signal is one representation;

maintaining power to the receiver of said wireless terminal only if said terminal is the authorized recipient of the transmission, for the remainder of said period of time, and maintaining power to the transmitter of said wireless terminal only if said terminal is the authorized source of the transmission, for the remainder of said period of time, in the event said status signal is a second representation; and maintaining power only to the transmitter of said wireless terminal, if said terminal desires to transmit in the event said status signal is a third representation.

14. The method of claim 13 wherein said synchronization signal has a spreading sequence known a priori to the base unit and the wireless terminal.

15. The method of claim 14 wherein said status signal associated with said synchronization signal is derived therefrom.

16. A wireless communication system for communication between a plurality of wireless terminals and a base station, said system comprising:

means for transmitting periodically by said base station, at the start of a first period of time, a synchronization signal and a status signal, transmitted over an initial period of time measured from the commencement of said first period of time, wherein said synchronization signal is a clocking signal and wherein said status signal represents command signal controlling communication to or from said base station;

means for transmitting by one of said plurality of wireless terminals a request signal, in a second period of time after a predetermined period measured from the commencement of said second period of time, said request signal indicating the identity of the one wireless terminal requesting subsequent transmission, the identity of the wireless terminals to whom the subsequent transmission is intended, the number of periods of time required for the subsequent transmission, and the frequency of the subsequent transmission;

means for responding by said base station to the receipt of the request signal by transmitting at the start of a third period of time, different from said first period of time, a synchronization signal, a busy status signal, and an authorization signal, indicating the identity of the wireless terminal authorized to transmit, the identity of one or more wireless terminals authorized to receive, a starting period of time, and the number of periods of time;

means for transmitting by said base station at the start of said starting period of time, a synchronization signal and a first reserve status signal; and means for transmitting a data signal by the one wireless terminal immediately after the transmission of said first reserve status signal by said base station.

17. The system of claim 16 wherein said request signal is transmitted in said first period of time.

18. The system of claim 16 wherein said request signal is transmitted in said second period of time, different from said first period of time.

19. The system of claim 16 further comprising:

means for receiving said data signal by said base station, transmitted by said wireless terminal authorized; and means for storing said data signal received by said base station.

20. The system of claim 19 further comprising:

means for transmitting by said base station at the start of a period of time, after transmission of said data signal by the authorized wireless terminal, a synchronization signal and a second reserve status signal, said second reserve status signal indicating said base station waiting for a response signal from the wireless terminal authorized to receive the data signal.

21. The system of claim 20 further comprising:

means for retransmitting said data signal by said base station in the event no response signal is received by said base station.

22. The system of claim 20 further comprising:

means for retransmitting said data signal as a broadcast signal to a plurality of wireless terminals authorized to receive said data signal, in the event no response signal is received by said base station.

23. The system of claim 21 wherein said means for retransmitting retransmits said data signal as a wired relay signal to a second base station for wireless retransmission by said second base station.

24. The system of claim 23 wherein said means for retransmitting retransmits said data signal as a wired relay signal to said second base station for retransmission to a plurality of wireless terminals authorized to receive said data signal.

25. The system of claim 23 wherein said means for retransmitting retransmits said data signal as a wired relay station to said second base station for retransmission to a wireless terminal authorized to received said data signal.

26. A wireless terminal for communicating wirelessly with a base unit, said terminal comprising:

means for supplying power to said wireless terminal periodically at the commencement of a period of time;

means for receiving a synchronization signal and a status signal transmitted from the base unit by said wireless terminal after the start of said period of time;

means for decoding said status signal into one of three possible representations; and means for maintaining power to the receiver of said wireless terminal for the remainder of said period of time, in the event said status signal is one representation;

and for maintaining power to the receiver of said wireless terminal only if said terminal is the authorized recipient of the transmission, for the remainder of said period of time, and maintaining power to the transmitter of said wireless terminal only if said terminal is the authorized source of the transmission, for the remainder of said period of time, in the event said status signal is a second representation;

and for maintaining power only to the transmitter of said wireless terminal, if said terminal desires to transmit in the event said status signal is a third representation.

27. A method of operating a wireless terminal in wireless communication with a stationary base unit to conserve power usage, said method comprising the steps of:

supplying cordless power to said wireless terminal periodically at the commencement of a period of time;

receiving a synchronization signal and a status signal transmitted from the base unit by said wireless terminal after the start of said period of time;

decoding said status signal into one of three possible representations; and maintaining cordless power to the receiver of said wireless terminal for the remainder of said period of time, in the event said status signal is one representation; or maintaining power to the receiver of said wireless terminal only if said terminal is the authorized recipient of the transmission, for the remainder of said period of time, and maintaining power to the transmitter of said wireless terminal only if said terminal is the authorized source of the transmission, for the remainder of said period of time, in the event said status signal is a second representation; or maintaining power only to the transmitter of said wireless terminal, if said terminal desires to transmit in the event said status signal is a third representation.

28. A base station for communicating wirelessly with a plurality of wireless terminals, said base station comprising:

means for transmitting periodically, at the start of a first period of time, a synchronization signal and a status signal, transmitted over an initial period of time measured from the commencement of said first period of time, wherein said synchronization signal is a clocking signal and wherein said status signal represents command signal controlling communication to or from said base station;

means for receiving a request signal transmitted by one of said plurality of wireless terminals in a second period of time, subsequent to said first period of time, said request signal indicating the identity of the one wireless terminal requesting subsequent transmission, the identity of one or more wireless terminals to whom the subsequent transmission is intended, the number of periods of time required for the subsequent transmission, and the frequency of the subsequent transmission;

means for responding to the receipt of the request signal by transmitting at the start of a third period of time, different from said first and second periods of time, a synchronization signal, a busy status signal, and an authorization signal, indicating the identity of the one wireless terminal authorized to transmit, the identity of one or more wireless terminals authorized to receive, a starting period of time, and the number of periods of time; and means for transmitting at the start of said starting period of time, a synchronization signal and a first reserve status signal, wherein said first reserve status signal is a control signal permitting the one wireless terminal to transmit a data signal immediately after the transmission of said first reserve status signal.

29. The base station of claim 28 wherein said receiving means receives said request signal, in said first period of time after said initial period of time measured from the commencement of said first period of time.

30. The base station of claim 28 wherein said receiving means receives said request signal, in said second period of time, different from said first period of time after said initial period of time measured from the commencement of said second period of time.

31. The base station of claim 28 further comprising:

means for receiving said data signal, transmitted by said wireless terminal authorized; and means for storing said data signal received.

32. The base station of claim 31 further comprising:

means for transmitting at the start of a period of time, after transmission of said data signal by the authorized wireless terminal, a synchronization signal and a second reserve status signal, said second reserve status signal indicating said base station waiting for a response signal from the wireless terminal authorized to receive the data signal.

33. The base station of claim 32 further comprising:

means for retransmitting said data signal in the event no response signal is received.

34. The base station of claim 31 further comprising:

means for retransmitting said data signal as a broadcast signal to a plurality of wireless terminals authorized to receive said data signal.

35. The base station of claim 33 wherein said means for retransmitting retransmits said data signal as a wired relay signal to a second base station for wireless retransmission by said second base station.

36. The base station of claim 33 wherein said means for retransmitting retransmits said data signal as a wired relay signal to said second base station for retransmission to a plurality of wireless terminals authorized to receive said data signal.

37. The base station of claim 33 wherein said means for retransmitting retransmits said data signal as a wired relay station to said second base station for retransmission to a wireless terminal authorized to received said data signal.

38. A method of operating a base station in wireless communication with a plurality of wireless terminals, said method comprising the steps of:

transmitting periodically, at the start of a first period of time, a synchronization signal and a status signal, transmitted over an initial period of time measured from the commencement of said first period of time, wherein said synchronization signal is a clocking signal and wherein said status signal represents command signal controlling communication to or from said base station;

receiving a request signal transmitted by one of said plurality of wireless terminals in a second period of time, said request signal indicating the identity of the one wireless terminal requesting subsequent transmission, the identity of one or more wireless terminals to whom the subsequent transmission is intended, the number of periods of time required for the subsequent transmission, and the frequency of the subsequent transmission;

responding to the receipt of the request signal by transmitting at the start of a third period of time, different from said first and second periods of time, a synchronization signal, a busy status signal, and an authorization signal, indicating the identity of the one wireless terminal authorized to transmit, the identity of one or more wireless terminals authorized to receive, a starting period of time, and the number of periods of time; and transmitting at the start of said starting period of time, a synchronization signal and a first reserve status signal, wherein said first reserve status signal is a control signal permitting the one wireless terminal to transmit a data signal immediately after the transmission of said first reserve status signal.

39. The method of claim 38 further comprising the step of:

receiving said data signal, transmitted by said wireless terminal authorized; and storing said data signal received.

40. The method of claim 39 further comprising:

transmitting at the start of a slot, after transmission of said data signal by the authorized wireless terminal, a synchronization signal and a second reserve status signal, said second reserve status signal indicating said base station waiting for a response signal from the wireless terminal authorized to receive the data signal.

41. The method of claim 40 further comprising:

retransmitting said data signal in the event no response signal is received.

42. The method of claim 41 further comprising:

retransmitting said data signal as a broadcast signal to a plurality of wireless terminals authorized to receive said data signal.

43. The method of claim 42 further wherein said retransmitting step retransmits said data signal as a wired relay signal to a second base station for wireless retransmission by said second base station.

44. The base station of claim 42 wherein said retransmitting step retransmits said data signal as a wired relay signal to said second base station for retransmission to a plurality of wireless terminals authorized to receive said data signal.

45. The method of claim 42 wherein said retransmitting step retransmits said data signal as a wired relay station to said second base station for retransmission to a wireless terminal authorized to received said data signal.

\* \* \* \* \*